(12) United States Patent
Kusakabe

(10) Patent No.: US 9,183,472 B2
(45) Date of Patent: Nov. 10, 2015

(54) CONTROL APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Taketoshi Kusakabe, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/563,958

(22) Filed: Dec. 8, 2014

(65) Prior Publication Data
US 2015/0178602 A1 Jun. 25, 2015

(30) Foreign Application Priority Data

Dec. 24, 2013 (JP) ................................. 2013-266129
Oct. 10, 2014 (JP) ................................. 2014-209398

(51) Int. Cl.
*G06K 15/02* (2006.01)
(52) U.S. Cl.
CPC .................................. *G06K 15/1807* (2013.01)
(58) Field of Classification Search
USPC ........................................................ 358/1.15
See application file for complete search history.

(56) References Cited

U.S. PATENT DOCUMENTS 8,947,707 B1* 2/2015 Harris et al. .................. 358/1.15
2013/0070270 A1* 3/2013 Arita et al. .................... 358/1.12

FOREIGN PATENT DOCUMENTS

JP 9-193480 A 7/1997

OTHER PUBLICATIONS

Kanakubo Yukio, Printing Device and Method for Controlling Printing and Device Therefor, Jul. 29, 1997, Machine Translation Japanese Patent Publication JP09193480, All Pages.*

* cited by examiner

*Primary Examiner* — Ngon Nguyen
(74) *Attorney, Agent, or Firm* — Fitzpatrick, Cella, Harper & Scinto

(57) ABSTRACT

A control apparatus, comprising a reception unit configured to receive image data, a setting unit configured to set an operation mode, an image processing unit configured to generate print data based on the image data, a print control unit configured to cause a printing unit to perform printing on a printing medium based on the print data, a determination unit configured to determine whether reception of all the image data is complete before the printing unit completes predetermined printing, and a change unit configured to change the set operation mode to another operation mode in a case where the set operation mode is an operation mode in which printing based on the print data starts if the image processing unit generates the print data.

14 Claims, 8 Drawing Sheets

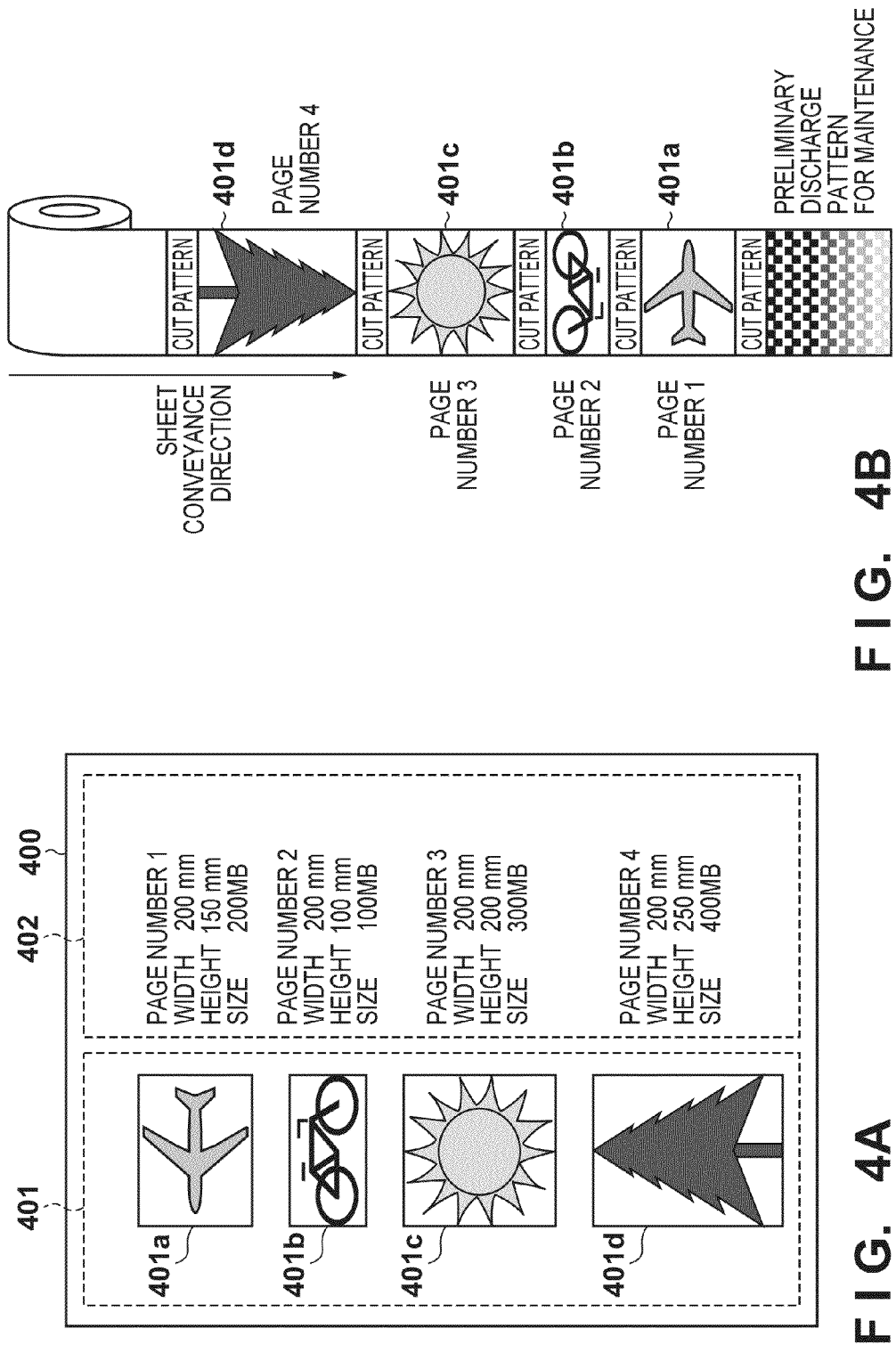

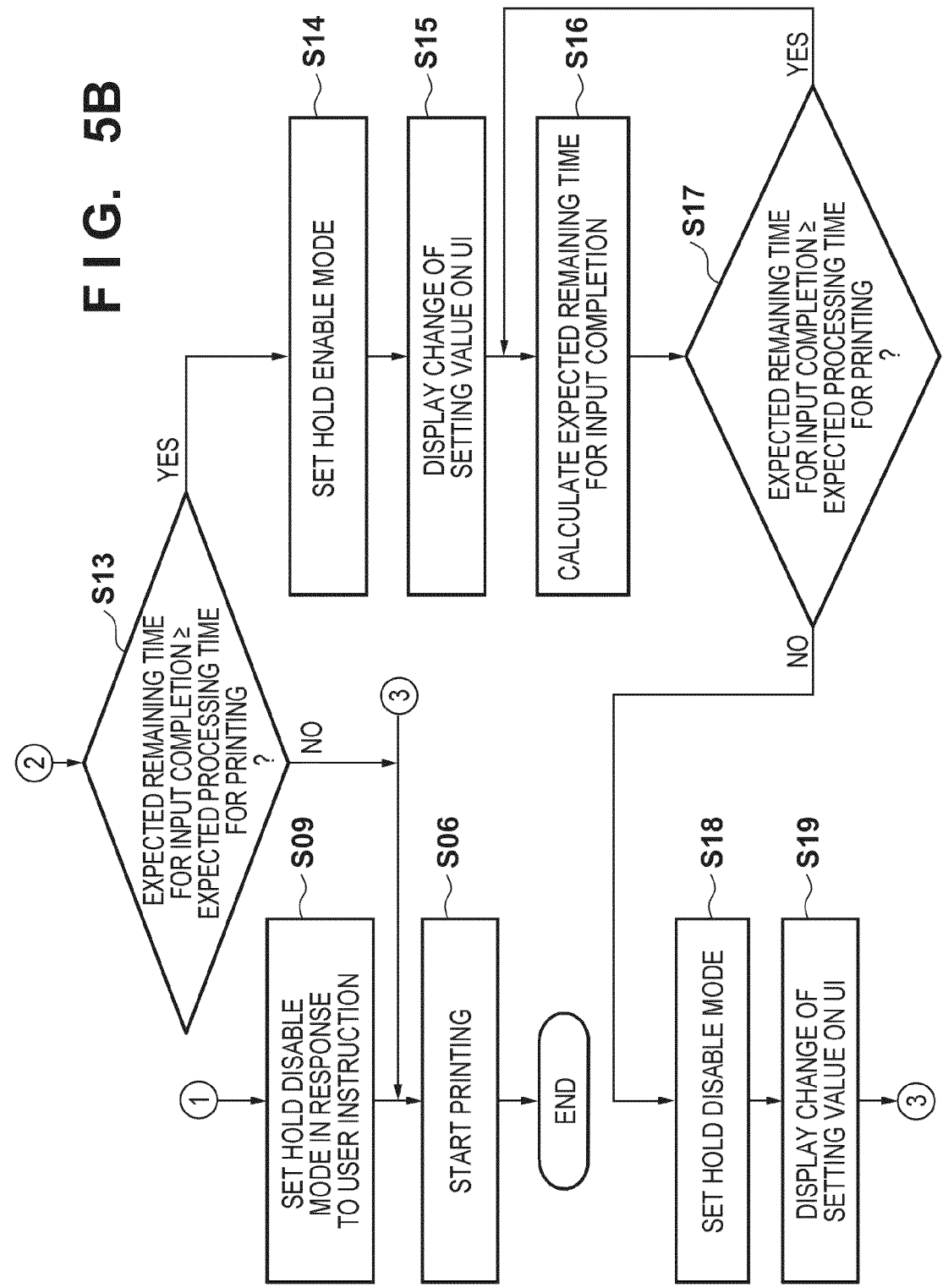

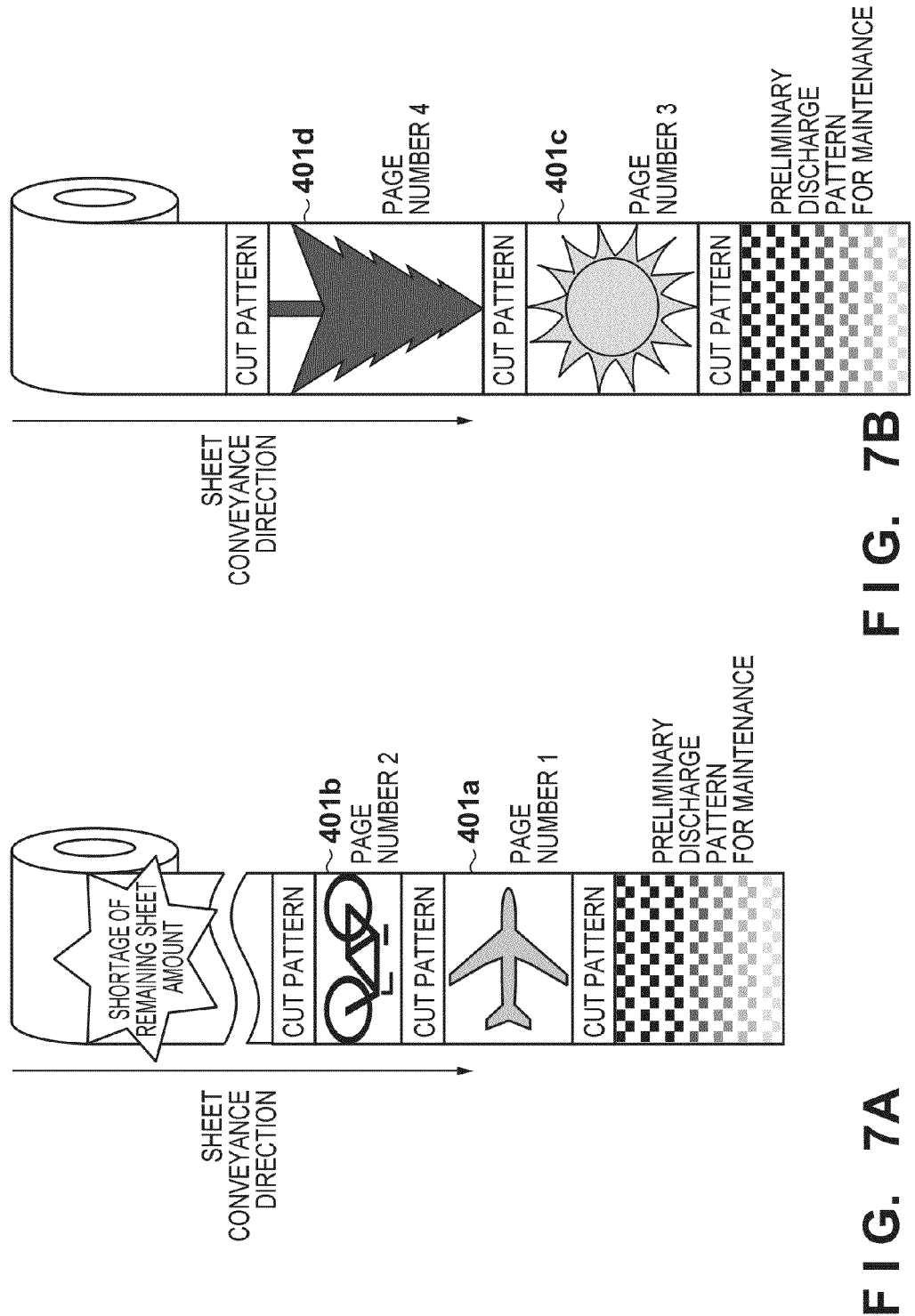

CONTROL APPARATUS, CONTROL METHOD, AND NON-TRANSITORY COMPUTER-READABLE STORAGE MEDIUM

BACKGROUND OF THE INVENTION

1. Field of the Invention

The present invention relates to a control apparatus, a control method, and a non-transitory computer-readable storage medium.

2. Description of the Related Art

A printing apparatus includes a reception unit configured to receive data for printing, and a printing unit configured to perform printing on a printing medium based on the data received by the reception unit. When performing printing, if a data amount (a receiving rate) received by the reception unit per unit time is equal to a data amount (a printing rate) printed by the printing unit per unit time, it is possible to continue a printing operation until a series of printing processes ends. Even if the receiving rate is higher than the printing rate, it is possible to continue a printing operation.

On the other hand, if the receiving rate is lower than the printing rate, data processible by the printing unit runs out (so-called "data-exhaust" occurs), and the printing operation may need to be interrupted even though printing is not complete yet. When the printing operation is interrupted due to data-exhaust, it is necessary to perform predetermined recovery processing (for example, a preliminary discharge operation) to resume printing, thereby wastefully consuming consumables such as a printing agent and printing medium.

Japanese Patent Laid-Open No. 9-193480 discloses a printing apparatus which, if the receiving rate is lower than the printing rate, starts a printing operation after an amount of data being received reaches a predetermined amount, and makes preparations to start the printing operation before the amount of data being received reaches the predetermined amount. The printing apparatus according to Japanese Patent Laid-Open No. 9-193480 can perform efficient printing while suppressing an increase in memory capacity for storing received data.

According to Japanese Patent Laid-Open No. 9-193480, however, the printing operation starts after the amount of data being received reaches the predetermined amount regardless of the total data amount to be received. Therefore, for example, if the receiving rate is lower than the printing rate and the total data amount is much larger than the predetermined amount, data-exhaust may occur after the amount of data being received reaches the predetermined amount to start the printing operation.

SUMMARY OF THE INVENTION

The present invention has been made in consideration of the above-described problem, and is advantageous in suppressing the interrupt of a printing operation caused by data-exhaust.

One of the aspects of the present invention provides a control apparatus, comprising a reception unit configured to receive image data, a setting unit configured to set an operation mode, an image processing unit configured to generate print data based on the image data received by the reception unit, a print control unit configured to cause a printing unit to perform printing on a printing medium based on the print data generated by the image processing unit, a determination unit configured to determine whether reception of all the image data is complete before the printing unit completes predetermined printing based on the print data generated by the image processing unit, and a change unit configured to change, in a case where the operation mode set by the setting unit is an operation mode in which printing based on the print data starts if the image processing unit generates the print data, the set operation mode to an operation mode in which printing based on the print data does not start even if generation of the print data is complete, in accordance with a determination result of the determination unit.

Further features of the present invention will become apparent from the following description of exemplary embodiments with reference to the attached drawings.

BRIEF DESCRIPTION OF THE DRAWINGS

FIGS. 4A and 4B are views for explaining an example of a print job and printing products based on the print job;

FIGS. 5A and 5B are flowcharts for explaining a control method;

FIGS. 7A and 7B are views for explaining an example of printing products based on a print job.

DESCRIPTION OF THE EMBODIMENTS (First Embodiment)

Figure 1:
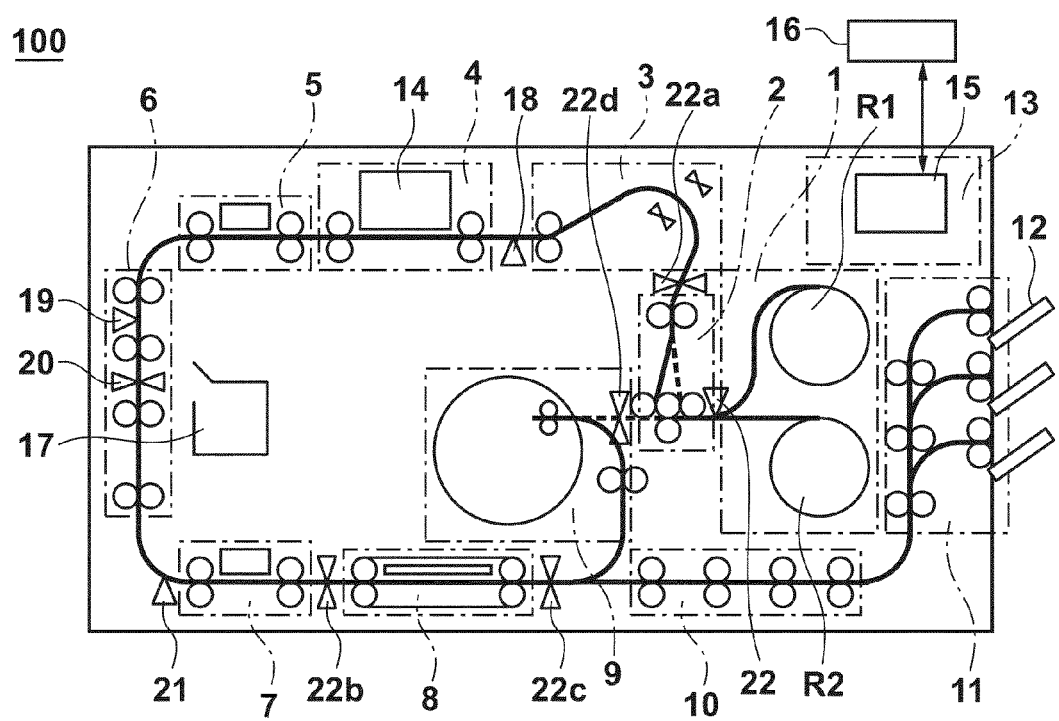
FIG. 1 is a view for explaining an example of the arrangement of a printing apparatus.

An embodiment of the present invention will be described below with reference to the accompanying drawings. FIG. 1 is a view showing a printing apparatus 100 as an example of a control apparatus according to this embodiment. The printing apparatus 100 shown in FIG. 1 is configured to perform single-sided printing or double-sided printing on a roll sheet by using the roll sheet as a printing medium. The printing apparatus 100 includes a so-called full-line type printhead, and can perform printing at the full width on the roll sheet at once. Printing on one surface of the roll sheet is performed using the printhead.

The roll sheet (to be simply referred to as a "sheet" hereinafter) is a long continuous sheet, more specifically, a sheet whose length in the conveyance direction is longer than the length of a unit image for one page. The sheet is wound into a roll, and provided within the printing apparatus 100. In this embodiment, a printing apparatus using a roll sheet as a printing medium (sheet) on which print processing is performed will be exemplified. However, the printing medium is not limited to the rolled form as long as it is a long continuous sheet which allows continuous printing of a plurality of pages on the same surface without interrupting the printing. Note that if one or a plurality of images, characters, and space exist within a region of one page, the unit image indicates the region of one page including the images, characters, and space. In other words, for example, if a plurality of pages are sequentially printed on the sheet, the unit image indicates a printing product for one page. The length (the length in the conveyance direction) of the unit image is different for each image size. For example, the length is 135 mm for an L-size photo, and is 297 mm for the A4 size.

FIG. 1 is a schematic view showing the printing apparatus 100. The printing apparatus 100 includes a sheet supply unit 1, a decurling unit 2, a skew correcting unit 3, a print unit 4, an inspection unit 5, a cutter unit 6, an information printing unit 7, a drying unit 8, a reversing unit 9, an eject-conveying unit 10, a sorter unit 11, ejecting units 12, and a control unit 13. A sheet is conveyed by a conveyance mechanism formed from rollers and a belt along a sheet conveyance path indicated by a solid line shown in FIG. 1. Each of the above-described units is arranged along the sheet conveyance path.

The sheet supply unit 1 includes, for example, two rolls R1 and R2 each holding a sheet. When one of the rolls is driven, the corresponding sheet is supplied from the roll to the sheet conveyance path. The two rolls R1 and R2 are exemplified here. However, the number of rolls is not limited to this, and may be one, or three or more. Note that the sheet is held while being wound into a roll in this embodiment. The present invention is not limited to this. For example, the sheet may be held while being folded over and stacked for every predetermined length, or may be a sheet on which perforations are formed for every predetermined length.

Note that with respect to an arbitrary position along the sheet conveyance path, a side closer to the sheet supply unit 1 will be referred to as "upstream" hereinafter and the opposite side will be referred to as "downstream" hereinafter. Each unit is provided with one or a plurality of rollers, as needed. The sheet having undergone predetermined processing by each unit is conveyed downstream.

The decurling unit 2 reduces the warp (curl) of the sheet supplied from the sheet supply unit 1. The decurling unit 2 bends the sheet supplied from the sheet supply unit 1 to exert a decurling force so as to give a warp in an opposite direction to the curl, thereby reducing the warp of the sheet. In this embodiment, the curl of the sheet is reduced by pressing two pinch rollers against one conveyance roller.

The skew correcting unit 3 corrects the skew (tilt with respect to the traveling direction of the sheet conveyance path) of the sheet having passed through the decurling unit 2. In this embodiment, the skew of the sheet is corrected by conveying the sheet while pressing one end of the sheet, which serves as a reference, against a guide member (not shown).

The print unit 4 performs printing on the sheet conveyed from the side of the skew correcting unit 3 by using a printhead 14 of the above-described full-line type. This forms an image on the sheet. The printhead 14 includes a plurality of printing element arrays. In this embodiment, the printhead 14 includes seven printing element arrays (not shown). Each of the seven printing element arrays is formed by arraying a plurality of printing elements in a direction intersecting the conveyance direction. The seven printing element arrays are arranged parallel to each other along the conveyance direction. The seven printing element arrays correspond to seven colors, for example, C (cyan), M (magenta), Y (yellow), LC (light cyan), LM (light magenta), G (gray), and K (black), respectively. The printing apparatus 100 drives each printing element of each printing element array in synchronism with conveyance of the sheet, and discharges ink of a corresponding color to the sheet via a nozzle corresponding to the printing element, thereby performing printing on the sheet.

Note that the number of printing element arrays is not limited to seven, and the printing element arrays may correspond to colors different from the above-described seven colors. In this embodiment, a printing apparatus which performs printing by an inkjet method is exemplified. However, the present invention is not limited to this, and any one of a method using heating elements, a method using piezoelectric elements, a method using electrostatic elements, a method using MEMS elements, and other known printing methods may be used.

The inspection unit 5 inspects the sheet having undergone printing by the print unit 4, and determines whether printing by the print unit 4 has been appropriately performed. The inspection unit 5 uses a scanner formed from, for example, a CCD image sensor or CMOS image sensor to optically read an inspection pattern or image formed on the sheet by the print unit 4, thereby performing inspection. With this processing, for example, the state of each printing element array of the printhead 14, the states of the nozzles for discharging ink, the sheet conveyance state, the position of the formed image, and the like are inspected, thereby determining whether the image has been correctly formed.

The cutter unit 6 cuts, for every predetermined unit, the sheet supplied from the inspection unit 5. The cutter unit 6 mechanically cuts the sheet by, for example, driving an auto cutter 20 (to be simply referred to as the "cutter 20" hereinafter) in response to detection of a cut pattern by a sensor 19. Furthermore, a garbage box 17 is provided near the cutter unit 6, and unnecessary sheet strips cut off by the cutter unit 6 are collected in the garbage box 17. A distribution mechanism for distributing a sheet on which an image has been formed (a sheet to be output from the printing apparatus 100) and a sheet strip which has been cut off is provided in the cutter unit 6.

Note that the length of the predetermined printing unit is different depending on an image size to be printed. For example, the length in the conveyance direction is 135 mm for an L-size photo, and is 297 mm for the A4 size. For single-sided printing, the cutter unit 6 cuts the sheet for every page unit. However, depending on contents of a print job, the cutter unit 6 does not cut the sheet for every predetermined unit (to be also referred to as a unit image hereinafter) in some cases. For a double-sided printing, if printing is performed on the second surface (for example, a reverse surface) after images for a predetermined length are continuously printed on the first surface (for example, an obverse surface) without cutting the sheet for every predetermined unit and the sheet is then cut at the trailing end, the cutter unit 6 cuts the sheet for each page. That is, after printing on the first surface of the sheet and before printing on the second surface of the sheet, the sheet is cut to have a predetermined length. Then, after printing on the second surface, the sheet is cut for every predetermined unit. Note that as the predetermined unit, for example, a page unit, an impression unit including a plurality of pages, or the like may be used.

Note that in addition to the auto cutter 20, manual cutters 22 (22a to 22d) used by the user to manually cut the sheet may be provided in the printing apparatus 100. If, for example, the sheet jams, each of the manual cutters 22 is used to remove the sheet from the sheet conveyance path by cutting the sheet, and manually operated by the user. The manual cutter 22a is provided between the decurling unit 2 and the skew correcting unit 3. The manual cutter 22b is provided between the information printing unit 7 and the drying unit 8. The manual cutter 22c is provided between the drying unit 8 and the reversing unit 9 and eject-conveying unit 10. The manual cutter 22d is provided between the decurling unit 2 and the reversing unit 9. The manual cutters 22 are not limited to them, and may be provided at, for example, positions different from the above four positions, and the number of manual cutters is not limited to this.

The information printing unit 7 prints print information (unique information such as a serial number and date) on the sheet. For example, an edge sensor 21 for sensing the leading end (the end portion on the downstream side) of the sheet cut by the cutter unit 6 is provided between the cutter unit 6 and the information printing unit 7. The information printing unit 7 prints print information on the sheet based on, for example, the timing of detection by the edge sensor 21.

The drying unit 8 performs drying processing for the printed sheet, thereby drying attached ink within a short time. More specifically, in the drying unit 8, the ink-applied surface of the sheet is exposed to, for example, hot air. Note that a drying processing method is not limited to the method using hot air, and a method of irradiating the sheet surface with electromagnetic waves (ultraviolet rays or infrared rays) or another known drying method can be used.

Note that the above-described sheet conveyance path from the sheet supply unit 1 to the drying unit 8 will be referred to as a "first path" hereinafter.

To perform double-sided printing, the reversing unit 9 reverses the sheet having undergone printing on the obverse surface (first surface). More specifically, to perform double-sided printing, the cutter unit 6 does not cut, for every predetermined unit, the continuous sheet having undergone printing by the print unit 4, and the reversing unit 9 temporarily winds and then reverses the continuous sheet. After that, the reversing unit 9 supplies the reversed continuous sheet to the print unit 4 via the decurling unit 2 again. More specifically, the reversing unit 9 includes a winding rotation member (drum) for winding the continuous sheet. The continuous sheet having undergone printing on the obverse surface is temporarily wound by the winding rotation member, and then conveyed to the print unit 4 via the decurling unit 2 by reversely rotating the winding rotation member. At this time, the continuous sheet is reversed after it is wound, and then conveyed to the print unit 4. The print unit 4 performs printing on the reverse surface (second surface).

Note that the path from the drying unit 8 to the print unit 4 via the decurling unit 2 will be referred to as a "second path" hereinafter.

The eject-conveying unit 10 conveys, to the sorter unit 11, the sheet which has been cut by the cutter unit 6 and then dried by the drying unit 8. The sorter unit 11 classifies, based on a predetermined criterion, a sheet (a sheet to be output from the printing apparatus 100) on which an image has been formed, and ejects the sheet from a corresponding one of the ejecting units 12.

Note that the path from the eject-conveying unit 10 to the sorter unit 11 will be referred to as a "third path" hereinafter.

A path switching mechanism having a movable flapper is provided between the first path and the second and third paths to selectively convey, to one of the second and third paths, the sheet conveyed through the first path.

A mark reader 18 is provided between the skew correcting unit 3 and the print unit 4. The mark reader 18 optically reads a reference mark printed on the obverse surface of the continuous sheet conveyed from the reversing unit 9. The mark reader 18 is, for example, a reflective optical sensor, and includes a light source (for example, a white LED) for illuminating the obverse surface of the sheet, and an image sensor for detecting light from the illuminated surface for each of R, G, and B components.

Figure 2:
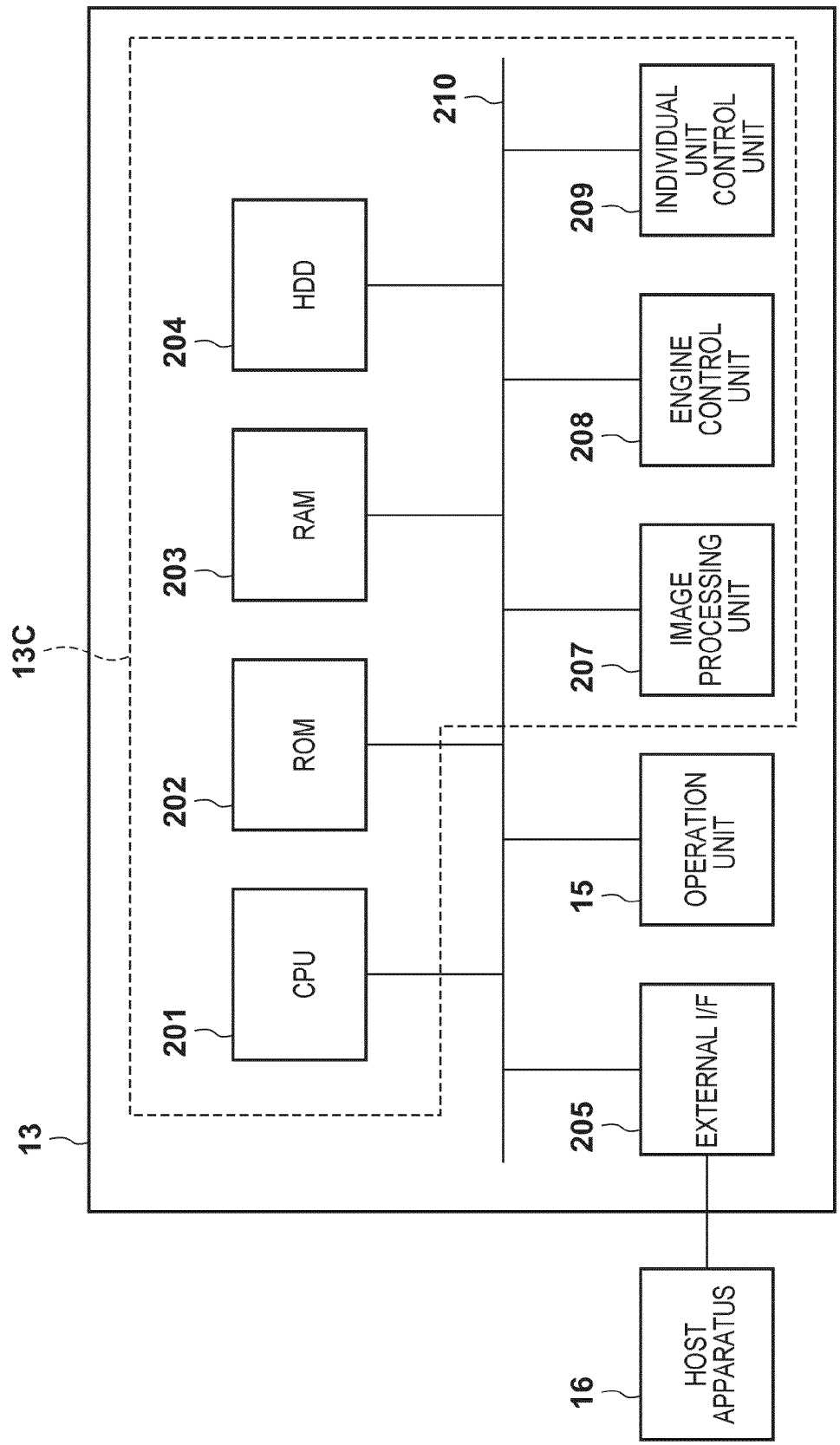
FIG. 2 is a block diagram for explaining an example of the arrangement of a control unit of the printing apparatus.

The control unit 13 will be described with reference to FIG. 2. The control unit 13 performs printing control. More specifically, the control unit 13 controls each unit of the printing apparatus 100, thereby controlling the overall operation of the printing apparatus 100. The control unit 13 includes a CPU 201, a ROM 202, a RAM 203, an HDD 204, an image processing unit 207, an engine control unit 208, an individual control unit 209, an external interface (I/F) 205, and an operation unit 15. These units are connected to each other via a system bus 210, and exchange data and information, as needed.

The control unit 13 receives, via the external I/F 205, a print job from a host apparatus 16 such as a general-purpose or dedicated computer such as a personal computer, an image apparatus such as a camera, or another terminal, and controls each unit of the printing apparatus 100 based on the job. The operation unit 15 is a user interface, and can include an input unit such as hard keys and a touch panel, and an output unit such as a display and voice generator. Information necessary to perform printing, which includes the operation state of the printing apparatus 100, is displayed on the operation unit 15. The user can use the operation unit 15 to make various necessary settings, as needed.

The CPU 201 (Central Processing Unit) performs arithmetic processing to control the operation of each unit of the printing apparatus 100. The ROM 202 stores programs to be executed by the CPU 201, and permanent data necessary for a printing operation by the printing apparatus 100. The RAM 203 is used as a work area for the CPU 201, or used as an area for temporarily storing data such as print data indicating an image to be printed and setting information necessary to perform printing. The HDD 204 (Hard Disk) stores the above-described programs and data. These programs and data are read out from the HDD 204.

The image processing unit 207 performs image processing based on the setting information and, for example, performs color conversion from a color space (for example, YCbCr) into a standard RGB color space (for example, sRGB) for input image data. In this way, the image processing unit 207 generates data to be output. Note that at the time of the above-described image processing, resolution conversion, image analysis, image correction, and the like may be performed, as needed. The thus obtained data is stored in the RAM 203 or HDD 204.

The engine control unit 208 controls the operation of a driving unit for driving each unit. For example, the engine control unit 208 controls driving of the printhead 14 of the print unit 4 based on a control command from the CPU 201. For example, the engine control unit 208 also controls driving of the conveyance mechanism of each unit of the printing apparatus 100.

The individual control unit 209 controls each of the sheet supply unit 1, decurling unit 2, skew correcting unit 3, inspection unit 5, cutter unit 6, information printing unit 7, drying unit 8, reversing unit 9, eject-conveying unit 10, sorter unit 11, and ejecting units 12. For example, the operation of each unit is controlled based on a command from the CPU 201.

Note that among the above-described units, the units (the CPU 201, ROM 202, RAM 203, HDD 204, image processing unit 207, engine control unit 208, and individual control unit 209) surrounded by a broken line are regarded as a "main control unit 13C". The main control unit 13C performs processing to control the printing operation based on the print job from the host apparatus 16 and setting information input by the user via the operation unit 15. Note that in this embodiment, the print job includes print data and information for performing printing. All of the above processes may be performed by software, or some or all of the processes may be performed by hardware.

Figure 3A:
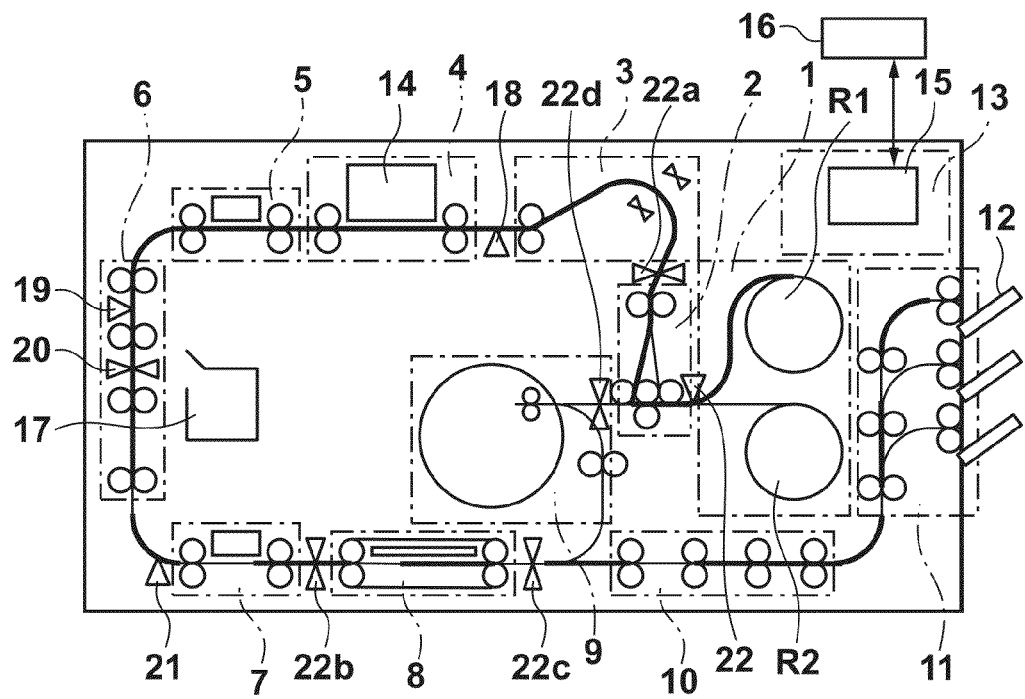
FIGS. 3A and 3B are views for explaining examples of operations in a single-sided print mode and a double-sided print mode, respectively.

The printing operation according to this embodiment will be described with reference to FIGS. 3A and 3B. FIG. 3A is a view for explaining an operation in a single-sided print mode. Referring to FIG. 3A, a thick line along the sheet conveyance path indicates the sheet. The sheet supply unit 1 supplies the sheet to the sheet conveyance path, and the sheet is conveyed to the print unit 4 via the decurling unit 2 and skew correcting unit 3. The print unit 4 performs printing on the obverse surface (first surface) of the sheet. More specifically, while conveying the sheet, the print unit 4 sequentially forms unit images for one or a plurality of pages on the sheet. In this embodiment, a margin region is provided between the adjacent unit images and, for example, the cut pattern is formed in the margin region.

The sheet supplied from the print unit 4 is conveyed to the cutter unit 6 via the inspection unit 5, and cut by the auto cutter 20 for each unit image in response to detection of the cut pattern by the sensor 19.

The information printing unit 7 receives the sheet (to be referred to as a "cut sheet" hereinafter) cut by the cutter unit 6, and prints print information (unique information such as a serial number and date) on, for example, the reverse surface (second surface) of the sheet, as needed. The cut sheets are conveyed to the drying unit 8 one by one, and undergo drying processing. The cut sheet having undergone the drying processing in the drying unit 8 is ejected from one of the ejecting units 12 via the eject-conveying unit 10 and sorter unit 11, and stacked.

Note that the sheet which has been cut by the cutter unit 6 and remains upstream of the cutter unit 6 (on the side of the print unit 4 or the like) is returned to the sheet supply unit 1 by driving the roll R1 or R2 in a direction opposite to the conveyance direction.

As described above, in the single-sided print mode, the sheet is processed by passing through the above-described first and third paths without passing through the second path.

By summarizing the above-described single-sided print mode in terms of the control operation by the control unit 13, a sequence of (1) to (6) below is executed.

(1) The sheet is conveyed from the sheet supply unit 1 to the print unit 4.

(2) The print unit 4 repeats formation of a unit image and formation of the cut pattern on the obverse surface of the sheet while conveying the sheet.

(3) The cutter unit 6 repeatedly cuts the sheet for each unit image.

(4) The cut sheets are conveyed to the drying unit 8 one by one.

(5) The cut sheets having passed through the drying unit 8 are sequentially ejected to one of the ejecting units 12.

(6) After cutting the last unit image formed by the print unit 4, the upstream sheet which has not been cut is returned to the sheet supply unit 1.

Figure 3B:
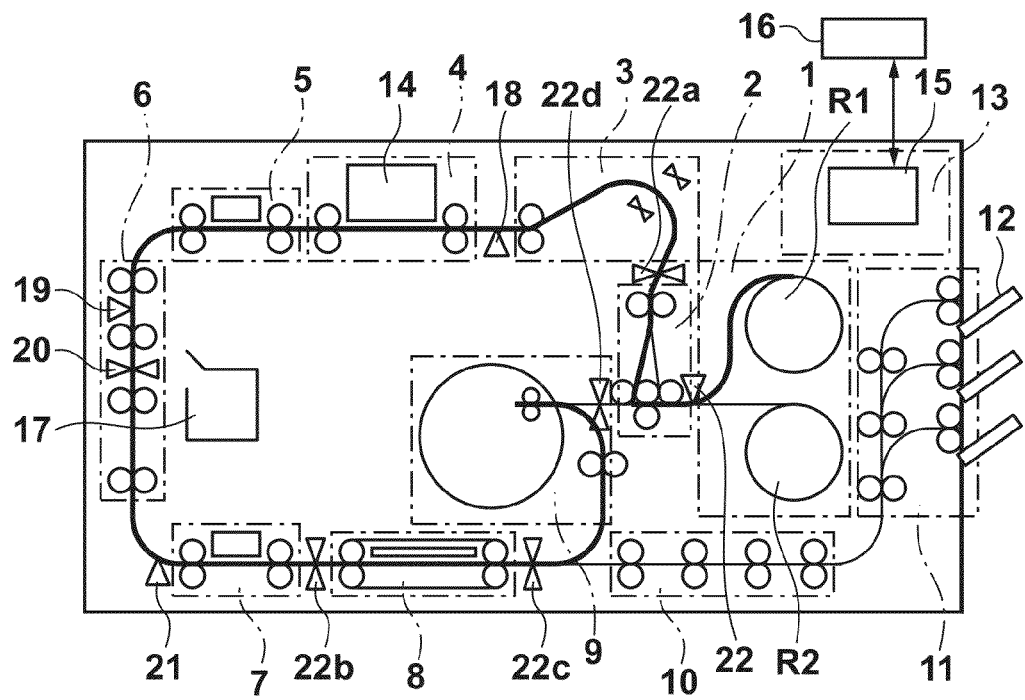

FIG. 3B is a view for explaining an operation in a double-sided print mode. In the double-sided print mode, after completion of printing on the obverse surface (first surface), printing on the reverse surface (second surface) is performed. The double-sided print mode is mainly different from the above-described single-sided print mode in that the sheet having undergone printing on the obverse surface is conveyed to the above-described second path (that is, the path on the side of the reversing unit 9). When performing printing on the obverse surface, the cutter unit 6 cuts the sheet at a position where printing on the obverse surface is completed without cutting the sheet for each unit image. Note that the sheet which has been cut by the cutter unit 6 and remains upstream of the cutter unit 6 is returned to the sheet supply unit 1.

The reversing unit 9 temporarily winds, using the winding rotation member, the sheet having undergone printing on the obverse surface and drying processing by the drying unit 8. After that, the sheet is conveyed from the drying unit 8 to the print unit 4 again via the decurling unit 2, and undergoes printing on the reverse surface. The sheet having undergone printing on the reverse surface is cut by the cutter unit 6, and the cut sheets are sequentially ejected from one of the ejecting units 12 in the same procedure as that in the single-sided print mode.

As described above, in the double-sided print mode, the sheet is processed by sequentially passing through the first, second, first, and third paths in the order named.

By summarizing the above-described double-sided print mode in terms of the control operation by the control unit 13, a sequence of (1) to (11) below is executed.

(1) The sheet is conveyed from the sheet supply unit 1 to the print unit 4.

(2) The print unit 4 repeats formation of a unit image and formation of the cut pattern on the obverse surface of the sheet while conveying the sheet.

(3) The sheet is conveyed to the drying unit 8.

(4) The sheet having passed through the drying unit 8 is conveyed to the reversing unit 9.

(5) The cutter unit 6 cuts the sheet having undergone printing on the obverse surface.

(6) The cut sheet is conveyed to the reversing unit 9 while the sheet which has been cut and remains upstream is returned to the sheet supply unit 1.

(7) The sheet conveyed to the reversing unit 9 is reversed, and the reversed sheet is conveyed to the print unit 4 again.

(8) The print unit 4 repeats formation of a unit image and formation of the cut pattern on the reverse surface of the reversed sheet while conveying the reversed sheet.

(9) The cutter unit 6 repeatedly cuts the sheet for each unit image.

(10) The cut sheets are conveyed to the drying unit 8 one by one.

(11) The cut sheets having passed through the drying unit 8 are ejected to one of the ejecting units 12.

FIG. 4A shows data contents for explaining a print job 400. The print job 400 includes, for example, a plurality of image data 401 (401*a* to 401*d*) and pieces of print information 402 of the image data. The print job 400 is input from the host apparatus 16 as an external apparatus. The information 402 is information about image data for each page, and print instruction information including information indicating print conditions, and is analyzed by the control unit 13. Examples of the information indicating print conditions are print settings such as the print quality (high-speed print mode, photo print mode, standard print mode, or the like) and the type of sheet.

The information 402 can be formed by, for example, electronic data in the XML (Extensible Markup Language) format. The present invention, however, is not limited to this, and another format analyzed by the control unit 13 may be used. Note that instead of being included in the print job 400, the information 402 may be input from the host apparatus 16 or another external apparatus, or may be input from the operation unit 15.

The image data 401 are, for example, four photo data, and are formed by four unit images (for four pages). The image data 401*a* of the first page (page number 1) is, for example, a photo image which has a data size of 200 MB and has been instructed to be printed at a width of 200 mm and a height of 150 mm. The image data 401*b* of the second page (page number 2) is, for example, image data which has a data size of 100 MB and has been instructed to be printed at a width of 200 mm and a height of 100 mm. The image data 401*c* of the third page (page number 3) is, for example, image data which has a data size of 300 MB and has been instructed to be printed at a width of 200 mm and a height of 200 mm. The image data 401*d* of the fourth page (page number 4) is, for example, image data which has a data size of 400 MB and has been instructed to be printed at a width of 200 mm and a height of 250 mm. These image data 401 are recorded in the order of the page numbers.

Note that the image data 401 have the same width through all the pages, and thus are preferable to sequentially perform printing on the sheet. The image data 401 may also have different widths. Although the image data 401 have different heights in the respective pages, printing on the sheet is performed without any inconvenience. The case in which the image data 401 are formed from the four photo data has been explained. However, each image data 401 may form one printing product by a plurality of photo data, such as a photo book.

FIG. 4B is a view for explaining the sheet having undergone printing based on the print job 400. In the first part of the sheet, the maintenance pattern of the printhead 14 is printed. In this embodiment, the preliminary discharge pattern of the printhead 14 is printed. Printing of the preliminary discharge pattern is executed as an initial operation at the start of a series of printing operations. The printhead 14 is maintained by printing the preliminary discharge pattern. After printing the preliminary discharge pattern, the image data 401a to 401d are sequentially printed on the sheet. In this embodiment, the cut pattern is printed between the preliminary discharge pattern and the image of page number 1 and between respective images of page numbers 2 to 4. The cut pattern indicates a position where the sheet is cut, and the sheet is cut by the cutter unit 6 for each page at the position where the cut pattern has been formed. The preliminary discharge pattern and cut patterns are non-printing products, and regions where the preliminary discharge pattern and cut patterns have been printed are collected in, for example, the above-described garbage box 17 after cutting.

Next, "data-exhaust" indicating that data capable of undergoing print processing by the printhead 14 runs out due to a low data receiving rate will be described with reference to FIGS. 1, 2, 4A, and 4B. Note that if data-exhaust occurs, the printing operation needs to be interrupted even though printing on the sheet is not complete.

Upon receiving the print job 400 from the host apparatus 16, the image processing unit 207 of the control unit 13 sequentially generates print data to be output to the printhead 14 for the respective image data 401a to 401d. Printing on the sheet is sequentially performed based on the generated print data. Assume, for example, that the processing time for receiving the image data 401c from the host apparatus 16 (the time required to complete reception) is longer than the processing time for receiving the image data 401a and 401b. In this case, reception of the image data 401c may not be completed during execution of printing based on the image data 401a and 401b. Note that factors which increase the processing time for reception are a large data size, a decrease in transmission rate between the host apparatus 16 and the control unit 13, which is caused by the state of a network, and the like.

After the image data 401b and the immediately succeeding cut pattern are printed on the sheet, if the print data of the image data 401c has not been supplied to the printhead 14, the printhead 14 cannot continue the printing operation. The control unit 13 may unwantedly recognize the image data 401b as the last page. In this case, as described above, the cutter unit 6 cuts the sheet at a position (a cut pattern printing region) between the image data 401a and 401b, and each cut sheet on which the image has been formed is ejected from one of the ejecting units 12. Also, the sheet which has been cut and remains upstream is wound around the roll R1 or the like, as described above. If reception of the image data 401c and 401d is completed during or after the above processing, and print data corresponding to the image data are generated, the preliminary discharge pattern is printed again, and then the image data 401c and 401d are sequentially printed. As a result, as compared with a case in which the image data 401a, 401b, 401c, and 401d are continuously printed, a sheet amount and ink amount corresponding to the second preliminary discharge pattern are wastefully consumed. Furthermore, as compared with a case in which the image data 401a, 401b, 401c, and 401d are continuously printed, the time taken to convey the sheet wound around the roll R1 or the like to the print unit 4 again to resume printing of the image data 401c and 401d is additionally required.

To solve these problems, in this embodiment, the printing apparatus 100 has a plurality of operation modes. More specifically, the printing apparatus 100 has two operation modes for image processing, and two operation modes as print modes. By using the image processing modes, it is controlled whether the image processing unit 207 performs image processing for image data to generate print data while receiving the image data. In this embodiment, the control operation is performed depending on whether the on-the-fly method is enabled or disabled.

In the on-the-fly enable mode, the printing apparatus 100 generates print data while receiving the print job. That is, the printing apparatus 100 generates print data every time image data for one page is received. In the on-the-fly enable mode, the first printing operation is fast. Therefore, for example, this mode is preferably used when a printing product is formed by a single page.

On the other hand, in the on-the-fly disable mode, the printing apparatus 100 generates print data after completion of reception of the print job. That is, after receiving all the pages of the print job, the printing apparatus 100 generates print data. In the on-the-fly disable mode, the first printing operation is delayed, but completion of reception of all the data is prioritized, thereby preventing data-exhaust from occurring due to trouble of the apparatus during processing, and preventing printing from being interrupted. Therefore, for example, this mode is preferably used when it is desirable to reliably obtain a printing product of a plurality of pages.

By using the printing operation modes, it is controlled whether to start printing by immediately outputting the print data generated by the image processing unit 207 to the engine control unit 208. In this embodiment, the control operation is performed depending on whether the hold method is enabled or disabled.

In the hold enable mode, the printing apparatus 100 enters a standby state without starting printing even if generation of print data is complete, and cancels the hold state based on, for example, an instruction from the user, thereby starting printing. The hold enable mode is advantageous when printing operations based on a plurality of print jobs are performed at once. For example, this mode is preferably used when print data are generated during the night and collectively printed the next morning.

On the other hand, in the hold disable mode, as soon as print data is generated, the printing apparatus 100 starts printing based on the print data. The hold disable mode is preferably used when generation of print data is sufficiently complete or when it is necessary to advance printing for a specific print job even gradually.

A method of controlling the printing operation by the control unit 13 according to this embodiment will be described. The control unit 13 includes, for example, an inputting rate measurement unit, a print condition obtaining unit, a calculation unit for an expected processing time for printing, a calculation unit for an expected remaining time for input completion, and a printing start determination unit (none are shown).

The inputting rate measurement unit measures the inputting rate of a print job input via the external I/F 205. In other words, the inputting rate of a print job is the receiving rate of a print job (image data). A predetermined timing such as a printing start timing is used as a trigger to start a timer, the accumulation amount of reception data and that of the elapsed time are updated and stored. Based on the stored accumulation amount of reception data and the stored accumulation amount of the elapsed time, the inputting rate of a print job at an arbitrary time or the average of the inputting rates of the print job is calculated. Note that in this embodiment, the control unit 13 has the inputting rate measurement unit. The present invention, however, is not limited to this, and the control unit 13 may be configured to obtain the inputting rate without the inputting rate measurement unit.

The print condition obtaining unit obtains conditions and information about the processing time for printing based on the aforementioned information 402, and obtains, for example, information such as the data size of print data and the size (the printing length, that is, the length in the conveyance direction) of a unit image.

The calculation unit for the expected processing time for printing calculates an expected processing time for printing (that is, an expected time taken to complete printing) with respect to the received print job based on the information and print conditions obtained by print condition obtaining unit. In this embodiment, the calculation unit for the expected processing time for printing performs calculation based on the printing length and printing rate. Note that in this embodiment, the printing rate is a printing length per unit time by the printhead 14. The present invention, however, is not limited to this. For example, a print data amount processible by the printhead 14 per unit time may be used. In this embodiment, the control unit 13 includes the calculation unit for the expected processing time for printing. The present invention, however, is not limited to this, and the control unit 13 may be configured to obtain the expected processing time for printing without the calculation unit for the expected processing time for printing.

The calculation unit for the expected remaining time for input completion calculates the time taken to complete input of a print job based on the above-described inputting rate (receiving rate) and the data amount of image data of the unreceived print job (the print job whose reception processing is not complete). The data amount of the unreceived print job is calculated using the difference between the entire data amount (total data amount) and the received data amount based on the print information 402. In this embodiment, the control unit 13 includes the calculation unit for the expected remaining time for input completion. The present invention, however, is not limited to this. The control unit 13 may be configured to obtain the expected remaining time for input completion without the calculation unit for the expected remaining time for input completion.

The printing start determination unit compares the above-described expected remaining time for input completion with the expected processing time for printing, and determines whether to start printing. More specifically, if the expected remaining time for input completion is longer than the expected processing time for printing, the printing start determination unit determines to delay the start timing without starting printing.

Note that if the function of each of the above-described units is implemented by a program, the program is stored in the ROM 202, and read out and executed by the CPU 201. The control sequence of the printing operation according to this embodiment, which is executed by the CPU 201, will be explained below with reference to FIGS. 5A and 5B.

In step S01 (to be simply referred to as "S01" hereinafter, which also applies to other steps), reception of the print job 400 from the host apparatus 16 starts. Note that the image data are received as the print job 400.

In S02, it is determined whether the operation mode of the printing apparatus 100 is the on-the-fly enable mode or on-the-fly disable mode. If the operation mode is the on-the-fly disable mode, the process advances to S03; otherwise, the process advances to S04. Note that the on-the-fly method is set in response to a user instruction.

In S03, it is determined whether reception of the print job 400 has been completed. If reception has not been completed, S03 is repeated until reception is completed; otherwise, the process advances to S05.

In S04, it is determined whether the operation mode of the printing apparatus 100 is the hold enable mode or hold disable mode. If the operation mode is the hold disable mode, the process advances to S08; otherwise, the process advances to S09. Note that in this embodiment, if there is no user instruction, the hold enable mode has been set. The hold disable mode can be set in response to a user instruction.

Similarly to S04, it is determined in S05 whether the operation mode is the hold enable mode or hold disable mode. If the operation mode is the hold disable mode, the process advances to S06 to start printing; otherwise, the process advances to S07. Note that in this embodiment, if there is no user instruction, the hold enable mode has been set. The hold disable mode can be set in response to a user instruction.

In S07, for example, in response to a hold cancellation instruction (hold disabling instruction) input by the user via the operation unit 15, the process advances to S06 to start printing. Note that the hold cancellation instruction is not limited to that based on an operation using the operation unit 15, and may be based on an instruction from the host apparatus 16.

In S08, measurement of the inputting rate (receiving rate) of the print job 400 starts, and the process advances to S10.

In S09, in response to a hold cancellation instruction (hold disabling instruction), the process advances to S06 to start printing, similarly to S07.

In S10, as exemplified in FIG. 4A, the information about the image data and information indicating print conditions are obtained based on the information 402 of the print job 400. For example, information indicating that the widths of the respective pages are 200 mm, and the heights (page lengths) of the pages are 150, 100, 200, and 250 mm and the data sizes of the pages are 200, 100, 300, and 400 MB in the order of the page numbers from page number 1 is obtained. Furthermore, print settings such as the print quality (high-speed print mode, photo print mode, standard print mode, or the like) and the type of sheet are obtained. After that, the process advances to S11.

In S11, an expected processing time for printing (that is, an expected time taken to complete printing) is obtained. In this embodiment, the expected processing time for printing is calculated. In this embodiment, the expected processing time for printing is calculated by expecting a preparation time for printing, a printing time based on the print data generated from the image data, and a printing time for a maintenance pattern such as a preliminary discharge pattern. For example, as will be exemplified below, calculation is performed based on the information obtained in S10 and information about the printing operation by the printing apparatus 100.

$$\text{expected processing time for printing} = (A) + (B)/(C)$$

(A): preparation time for printing=(A1)
   (A1): conveyance time of sheet from sheet supply unit 1 to print unit 4
(B): printing length of calculation object=(B1)+(B2)
   (B1): printing length of preliminary discharge pattern
   (B2): printing length of printing products except for last page (page number 4) in print job 400
(C): printing rate of printhead 14

In this embodiment, (A1)=6 sec, (B1)=200 mm, (B2)=450 mm, and (C)=50 mm/sec, thereby obtaining (B)=(B1)+(B2)=650 mm. As a result, (B)/(C)=12 sec, and thus the expected time for printing is 19 sec.

The above values (A1), (B1), (B2), and (C) are examples of the information about the printing operation by the printing apparatus 100 and will be referred to as "convenience information" of the printing apparatus 100. The value (A1) depends on the printing apparatus 100, and is determined based on the conveyance length of the sheet, the conveying rate of the sheet, the preparation time for starting printing, and the like. The value (B1) also depends on the printing apparatus 100.

The printing length of the calculation object is calculated using a printing length (=550 mm) except for a printing length corresponding to the last page, instead of the printing length of all the pages in the print job 400, that is, a printing length (=700 mm) corresponding to the four image data 401a to 401d. This is because reception of the image data 401d need only be completed before starting printing of the image data 401d of page number 4. That is, in this embodiment, the time taken to complete printing up to a page immediately before the last page is calculated.

Furthermore, the value (C) may be different depending on the print quality (high-speed print mode, photo print mode, or the like), the type of sheet, the performance of the printhead 14, and the like. In this embodiment, the printing rate of the printhead 14 is set to 50 mm/sec for the standard print mode.

Among the above parameters, the parameters (A1) and (C) need only be obtained by referring to a reference table or lookup table in accordance with the contents of a print instruction.

Note that in this embodiment, the printing time of the cut pattern is sufficiently short, and is thus not included in the expected processing time for printing by considering it to fall within an error range. However, when calculating the expected processing time for printing, the printing time of a control pattern such as a cut pattern may also be considered. Furthermore, since it is only necessary to avoid data-exhaust, an expected processing time for printing of sheet cutting processing and conveyance processing after completion of printing is not included.

As described above, in this embodiment, the expected processing time for printing is calculated as 19 sec in S11, and the process advances to S12.

In S12, the above-described expected remaining time for input completion is calculated. In this embodiment, the reception time of unreceived image data among all the image data of the print job is expected and calculated. For example, as will be exemplified below, the time is calculated based on the total size of the image data of the print job, the size of received image data, and the image data receiving rate of the external I/F 205.

Note that the expected remaining time for input completion is calculated when print data for the image data 401a of page number 1 is generated to set a printing start enable state. In this embodiment, assume that the calculation timing is 30 sec after the print instruction.

$$\text{expected remaining time for input completion} = \{(D)-(E)\}/(F)$$

(D): total data size of image data of print job
(E): data size of received image data at calculation timing
(F): inputting rate of print job (receiving rate; average value for predetermined seconds after print instruction)

In this embodiment, (D)=1,000 MB (the total data size of the print job 400), (E)=450 MB, and (F)=15 MB/sec (the average value for 30 sec after the print instruction). Consequently, the expected remaining time for input completion is 36.7 sec.

The data size (E) of the received image data at the calculation timing changes depending on the printing environment and the lapse of time. The inputting rate (F) of the print job is obtained by measurement by the inputting rate measurement unit, and changes depending on the communication traffic between the host apparatus 16 and the external I/F 205, the performance of the external I/F 205, the performance of the CPU, and the like. Note that the calculation timing is not limited to the above-described one, and a fixed value such as 10 sec after the print instruction may be set.

As described above, in this embodiment, the expected remaining time for input completion is calculated as 36.7 sec in S12, and the process advances to S13.

It is determined in S13 whether reception of all the image data included in the print job is complete before completion of predetermined printing by a printing unit. In this embodiment, the magnitude relationship between the expected remaining time for input completion of the image data and the expected processing time for printing of the print data is determined. If the expected remaining time for input completion is equal to or shorter than the expected processing time for printing, it is determined to start printing, and the process advances to S06 to start printing while maintaining the hold disable mode. On the other hand, if the expected remaining time for input completion is longer than the expected processing time for printing, it is determined not to start printing, and the process advances to S14. In this embodiment, since the expected remaining time (36.7 sec) for input completion is longer than the expected processing time (19 sec) for printing, the process advances to S14.

Since it is determined in S13 that the expected remaining time for input completion is longer than the expected processing time for printing, and the above-described data-exhaust may occur, the operation mode is changed to the hold enable mode to set a standby state in S14, and the process advances to S15.

In S15, information indicating that the operation mode has been changed to the hold enable mode is displayed on the display of the operation unit 15 or the like, thereby notifying the user of it.

In S16, an expected remaining time for input completion is calculated again, similarly to S12.

The calculation timing is obtained by adding a predetermined time to the timing when print data for the image data 401a of page number 1 is generated to set the printing start enable state. In this embodiment, the calculation timing is set as "the timing when the printing start enable state is set+15 sec", that is, 45 sec after the print instruction.

$$\text{expected remaining time for input completion} = \{(D)-(E')\}/(F')$$

(D): total data size of print job
(E'): data size of received data at calculation timing
(F'): inputting rate of print job 400 (receiving rate; average for predetermined time after print instruction)

In this embodiment, (D)=1,000 MB (the total data size of the print job 400), (E')=675 MB, and (F')=15 MB/sec (the average value for 45 sec after the print instruction). Consequently, the expected remaining time for input completion is 21.7 sec.

The aforementioned calculation timing is 15 sec after S12. However, the present invention is not limited to this, and an arbitrary timing may be used. For example, the calculation timing may be the timing when print data for the image data 401b of page number 2 is generated. The inputting rate (F') of the print job changes from the value (F) in S12, and takes a different value.

As described above, in this embodiment, the expected remaining time for input completion is updated by 21.7 sec in S16, and the process advances to S17.

Similarly to S13, it is determined in S17 whether reception of all the image data included in the print job is complete before completion of printing by the printing unit. In this embodiment, the magnitude relationship between the expected remaining time for input completion of the image data and the expected processing time for printing is determined. If the expected remaining time for input completion is equal to or shorter than the expected processing time for printing, the process advances to S18; otherwise, the process returns to S16. In this embodiment, since the expected remaining time (21.7 sec) for input completion is longer than the expected processing time (19 sec) for printing, the process returns to S16.

In S16, an expected remaining time for input completion is calculated again. In this embodiment, as will be exemplified below, the expected remaining time for input completion is calculated as 6.7 sec.

The calculation timing is obtained by adding a predetermined time to the timing when print data for the image data 401a of page number 1 is generated to set the printing start enable state. That is, calculation is performed for every predetermined time (for example, every 10 sec). Note that calculation may be performed every time image processing of one page ends. It is only necessary to obtain, at this calculation timing, the data amount of the print data which have not been received by the reception unit. In this embodiment, the first calculation timing is set as "the timing when the printing start enable state is set+30 sec", that is, 60 sec after the print instruction.

expected remaining time for input completion={(D)−(E")}/(F")

(D): total data size of image data of print job
(E"): data size of received image data at calculation timing
(F"): inputting rate of print job (receiving rate; average for predetermined time after print instruction)

In this embodiment, (D)=1,000 MB (the total data size of the print job 400), (E")=675 MB, and (F")=15 MB/sec (the average value for 60 sec after the print instruction). Consequently, the expected remaining time for input completion is 6.7 sec.

As described above, the expected remaining time for input completion is updated by 6.7 sec in S16 executed again, and the process advances to S17.

The magnitude relationship between the expected remaining time for input completion and the expected processing time for printing is determined again in S17. In the above-described example, since the expected remaining time (6.7 sec) for input completion is shorter than the expected processing time (19 sec) for printing, the process advances to S18.

Since it is determined in S17 that the expected remaining time for input completion is equal to or shorter than the expected processing time for printing, and the above-describe data-exhaust does not occur, the operation mode is changed to the hold disable mode in S18, and the process advances to S19.

In S19, information indicating that the operation mode has been changed to the hold disable mode is displayed on the display of the operation unit 15 or the like, thereby notifying the user of it. After that, the process advances to S06 to start printing.

In this embodiment, it is determined whether reception of the image data included in the print job is complete before completion of predetermined printing by the printing unit. Even if the user has set the hold disable mode, when it is determined that reception of the image data of the print job is not complete before completion of printing by the printing unit, the operation mode is changed to the hold enable state. That is, the operation setting set by the user is automatically changed. After that, if it is determined that reception of the image data of the print job is complete before completion of printing by the printing unit, the operation mode is returned to the hold disable mode. In this way, the start timing of printing is determined. This can improve the printing throughput while suppressing the interrupt of the printing operation caused by data-exhaust. In other words, the start timing of the printing operation is determined based on the data amount of unreceived data, the inputting rate (receiving rate) of the data, and the printing rate (processing rate of the printhead 14) for the data. This can prevent data-exhaust even under print conditions in an operation mode in which the on-the-fly method is enabled and the hold method is disabled. In the on-the-fly enable mode, enable/disable of the hold method is switched depending on the situation. More specifically, when the hold disable mode is changed to the hold enable mode in the on-the-fly enable mode, if it is determined that reception of the image data of the print job is complete before completion of printing by the printing unit, the mode is returned to the hold disable mode. This can start printing earlier than a case in which printing is always performed in the on-the-fly disable mode or a case in which printing is always performed in the hold enable operation mode, thereby improving the productivity.

As described above, in this embodiment, it is possible to suppress the interrupt of printing of a print job by automatically changing the user settings according to an environment such as the input transmission rate of the print job. For example, if the user has set the on-the-fly mode and the hold disable mode, the apparatus operates according to the user settings in an environment where the input transmission rate of the print job is sufficiently high. On the other hand, in an environment where the input transmission rate of the print job is low, the user settings are canceled to delay the start of printing until a predetermined timing by setting the hold enable mode, and it is thus possible to start printing when it is determined that no interrupt occurs during printing of the print job. This can execute printing of the print job without any interrupt, and prevent the sheet from being wound back due to an interrupt of printing and the number of preliminary discharge operations from increasing, thereby improving the printing throughput.

In this embodiment, based on the image data amount of a print job, it is determined whether reception of the image data of the print job is complete before completion of printing by the printing unit. This can start printing at a more appropriate timing when, for example, the data size is different for each print job or a print job includes data of a plurality of pages having different sizes. If, for example, a fixed value is set as printing start enable time for a print job, it may be impossible to start printing even though printing can actually start, or printing may unwantedly start even though printing cannot start actually. To solve this problem, in this embodiment, it is possible to start printing at an appropriate timing when no interrupt occurs during printing of the print job.

Some steps may be omitted, the order of the steps may be changed, or steps may be added without departing from the spirit and scope of the present invention. For example, notifying the user of the change of the operation mode in S15 and S19 may be omitted. Furthermore, for example, an example in which the operation mode is automatically changed to the hold disable mode has been exemplified in S18. However, the user may manually change the operation mode via the operation unit 15.

Note that the parameters or numerical values exemplified in this embodiment can take different values by adopting another arrangement. The present invention is not limited to the above exemplified values (the same applies to the following embodiments).

(Second Embodiment)

Figure 5A:
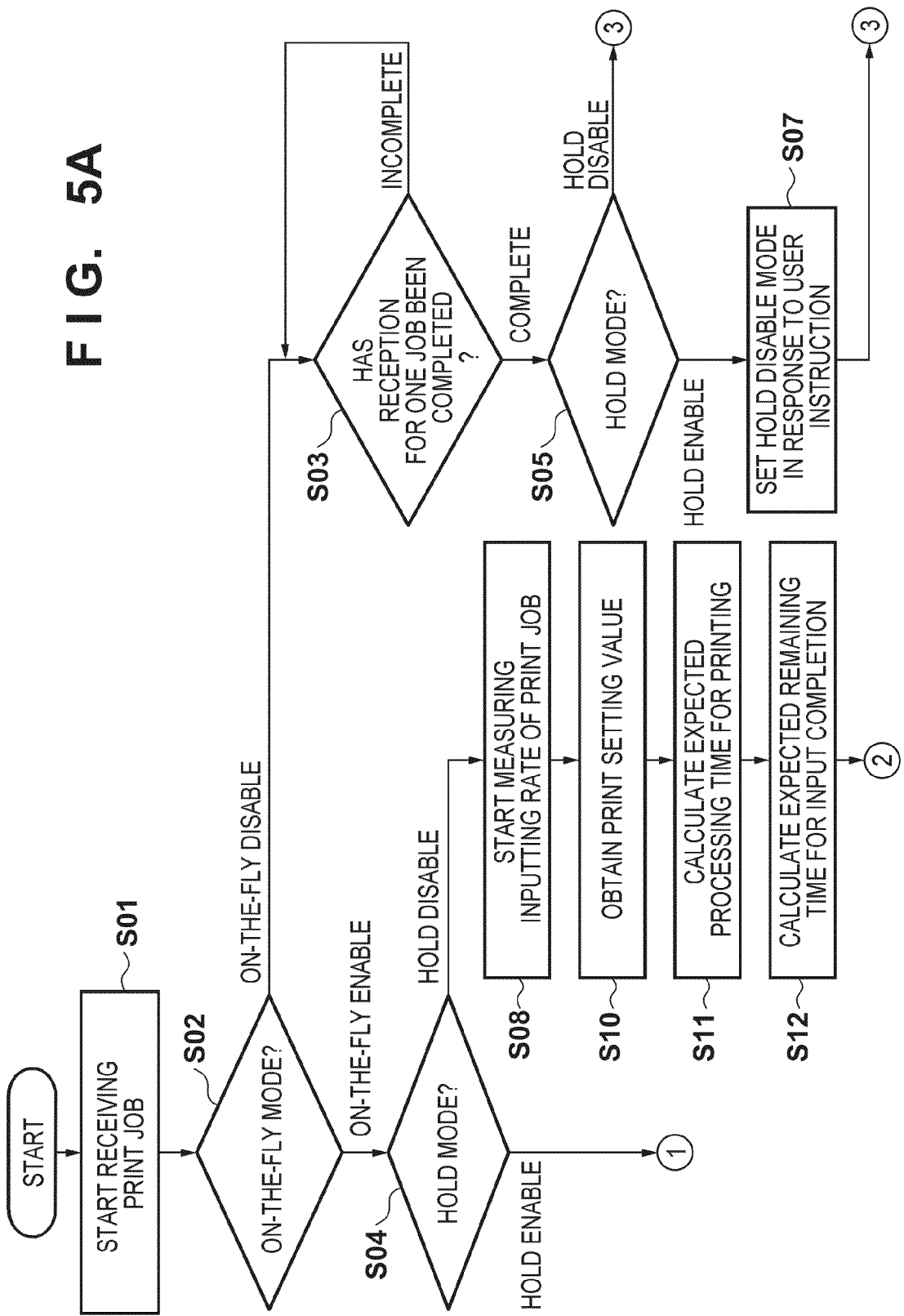

The second embodiment will be described with reference to FIGS. 5A and 5B. In the first embodiment, the printing length (B) of the calculation object is calculated by obtaining the sum of the printing length (B1) of the preliminary discharge pattern and that (B2) of the printing products except for the last page, resulting in (B)=450 mm. However, to avoid the above-describe data-exhaust, it is only necessary to complete reception of the image data 401d of the last page before completion of printing, and the present invention is not limited to the calculation method exemplified in the first embodiment. In this embodiment, as will be described below, the timing of starting printing is adjusted by using a value (B2) as the printing length of printing products for all the pages of the image data of a print job.

A control sequence according to this embodiment will be described below by focusing attention on the difference from the first embodiment. Note that a description of the same arrangement as that in the first embodiment will be omitted. S01 to S10 are the same as those in the first embodiment.

In S11, an expected processing time for printing is calculated by a method exemplified below.

expected processing time for printing=$(A\_2)+(B\_2)/(C\_2)$ (A_2): preparation time for printing=(A1_2)
 (A1_2): conveyance time of sheet from sheet supply unit 1 to print unit 4
(B_2): printing length of calculation object=(B1_2)+(B2_2)
 (B1_2): printing length of preliminary discharge pattern
 (B2_2): printing length of printing products of all pages of print job
(C_2): printing rate of printing apparatus In this embodiment, assume that (A_2)=(A1_2)=6 sec, (B1_2)=200 mm, (B2_2)=700 mm (the printing length of the printing products of all the pages (page numbers 1 to 4) of a print job 400), and (C_2)=50 mm/sec. Consequently, the expected processing time for printing is 24 sec.

As described above, the expected processing time for printing is calculated as 24 sec in S11, and the process advances to S12.

S12 to S15 are the same as those in the first embodiment.

In S16, an expected remaining time for input completion is calculated.

The calculation timing is obtained by adding a predetermined time to the timing when print data for image data 401a of page number 1 is generated to set the printing start enable state. In this embodiment, the calculation timing is set as "the timing when the printing start enable state is set+15 sec", that is, 45 sec after a print instruction.

expected remaining time for input completion=$\{(D\_2)-(E\_2)\}/(F\_2)$ (D_2): total data size of print job
(E_2): data size of received data at calculation timing
(F_2): inputting rate of print job (receiving rate; average value for predetermined time after print instruction)

In this embodiment, (D_2)=1,000 MB (the total data size of the print job 400), (E_2)=675 MB, and (F_2)=15 MB/sec (the average value for 45 sec after the print instruction). Consequently, the expected remaining time for input completion is 21.7 sec.

As described above, the expected remaining time for input completion is calculated as 21.7 sec in S16, and the process advances to S17.

In S17, the magnitude relationship between the expected remaining time for input completion and the expected processing time for printing is determined. In the above-described example, since the expected remaining time (21.7 sec) for input completion is shorter than the expected processing time (24 sec) for printing, the process advances to S18.

S18 and S19 are the same as those in the first embodiment.

As exemplified above, for example, a method of calculating the expected remaining time for input completion may be changed depending on the arrangement of a printing apparatus 100 and print conditions. The above control sequence makes it possible to obtain the same effects as those in the first embodiment.

(Third Embodiment)

The third embodiment will be described with reference to FIGS. 5 and 6. In the first embodiment, the printing time of the cut pattern formed between the images of the respective page numbers is sufficiently short, and is thus not included in the expected processing time for printing by considering it to fall within the error range. In this embodiment, in addition to the printing time of a preliminary discharge pattern inserted between pages, the printing time of a cut pattern is considered. Note that a description of the same arrangement as that in the first embodiment will be omitted.

Figure 6:
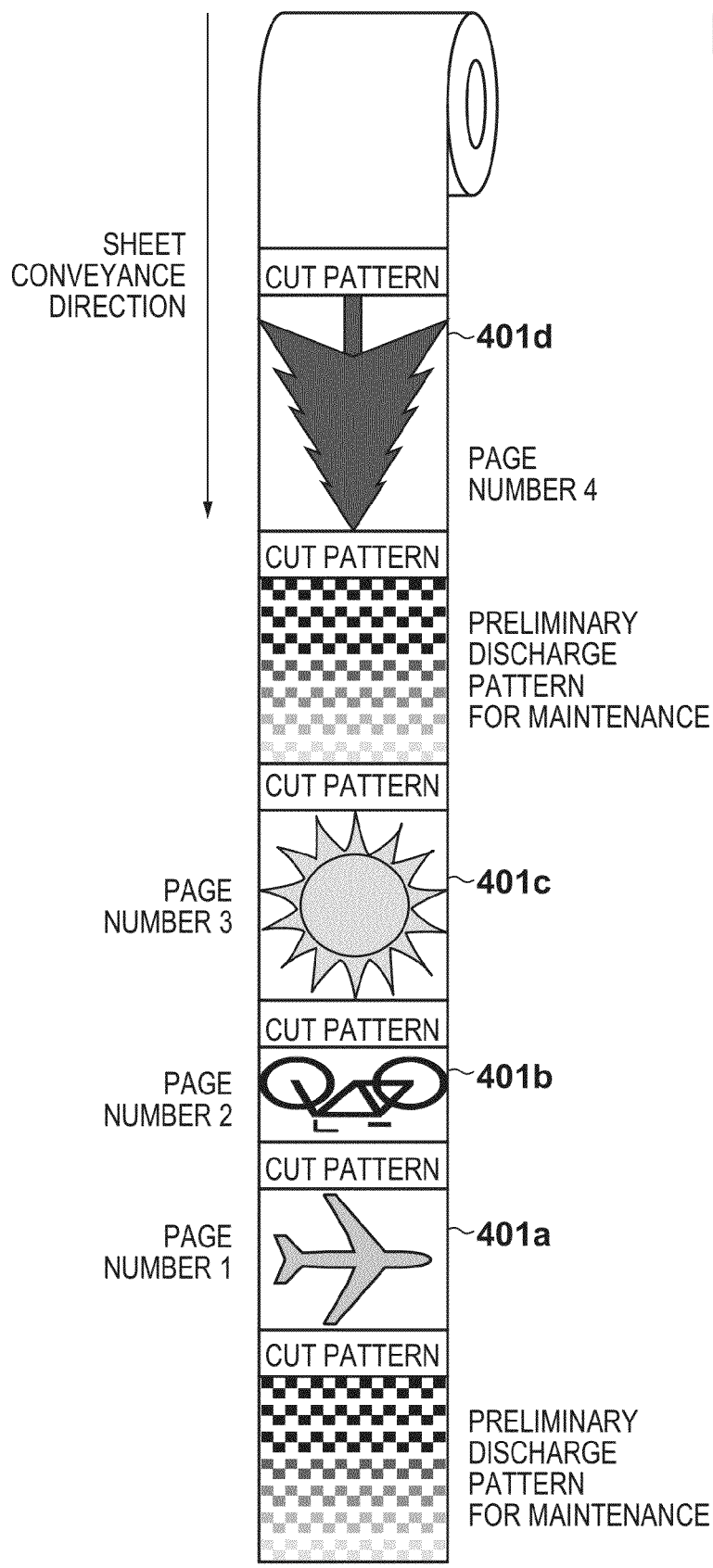
FIG. 6 is a view for explaining an example of printing products based on a print job.

FIG. 6 is a view for explaining a case in which the preliminary discharge pattern is formed between an image of page number 3 and an image of page number 4 when performing printing based on a print job 400. The preliminary discharge pattern is printed for every predetermined period (periodically) under the control of a control unit 13, and may be printed even between printing products, that is, even during the print job.

Note that a case in which the preliminary discharge pattern is printed for every predetermined period will be exemplified. However, the preliminary discharge pattern may be printed under another condition. For example, the preliminary discharge pattern may be printed when a printing amount by a printhead 14 exceeds a predetermined amount (the number of lines or dot count of an image), or when the operating time of a printing apparatus 100 exceeds a predetermined time.

A control sequence according to this embodiment will be described below with reference to FIG. 5A. S01 to S10 are the same as those in the first embodiment.

In S11, an expected processing time for printing is calculated, as will be exemplified below.

expected processing time for printing=$(A\_3)+(B\_3)/(C\_3)$ (A_3): preparation time for printing=(A1_3)
   (A1_3): conveyance time of sheet from sheet supply unit 1 to print unit 4
(B_3): printing length of calculation object=(B1_3)+(B2_3)+(B3_3)+(B4_3)
   (B1_3): printing length of first preliminary discharge pattern
   (B2_3): printing length of printing products except for last page in print job
      (B3_3): printing length of cut patterns inserted up to point immediately before last page of print job
   (B4_3): printing length of preliminary discharge patterns inserted up to point immediately before last page of print job
(C_3): printing rate of printing apparatus In this embodiment, assume that (A_3)=(A1_3)=6 sec. Furthermore, (B1_3)=200 mm, (B2_3)=450 mm (the printing length of the printing products except for page number 4 in the print job), (B3_3)=50 mm×5=250 mm, and (B4_3)=200 mm×1, resulting in (B_3)=1,100 mm. Assume also that (C_3)=50 mm/sec. Consequently, the expected processing time for printing is 28 sec.

Note that the printing length of each cut pattern is (B3_3)=50 mm and the printing length of the second preliminary discharge pattern is (B4_3)=(B1_3)=200 mm in this embodiment. However, the printing lengths are not limited to them. Also, in this embodiment, (B4_3)=(B1_3) is set. However, (B4_3)≠(B1_3) may be set.

As described above, the expected processing time for printing is calculated as 28 sec in S11, and the process advances to S12.

The control sequence from S12 is the same as that in the first embodiment.

According to this embodiment in which the preliminary discharge pattern that may be inserted between pages for every predetermined period is considered in addition to the cut patterns, it is also possible to obtain the same effects as those in the first embodiment.

(Fourth Embodiment)

The fourth embodiment will be described with reference to FIGS. 5, 7A, and 7B. Each of the aforementioned embodiments assumes the arrangement in which one of the rolls R1 and R2 is driven to supply the sheet from the sheet supply unit 1 and then printing is executed. In this embodiment, a case in which both rolls R1 and R2 are driven to perform printing will be explained. Note that a description of the same arrangement as that in the first embodiment will be omitted.

FIGS. 7A and 7B are views for explaining a case in which printing based on a print job 400 is executed. FIG. 7A is a view showing a case in which the remaining amount of a sheet supplied by driving the roll R1 is insufficient to form images from page number 3. That is, FIG. 7A is a view showing a case in which the sheet runs out when an image of page number 2 of the print job 400 and a cut pattern are printed. As shown in FIG. 7A, if the remaining amount of the sheet is insufficient to print the image of page number 3 when the image of page number 2 of the print job 400 and the cut pattern are formed, the images from page number 3 are printed on another roll. FIG. 7B schematically shows a case in which the roll R2 is driven to supply a sheet and the remaining printing operation is performed on the sheet in response to a shortage of the remaining sheet amount. The remaining printing operation on the other sheet is resumed after, for example, the preliminary discharge pattern is formed.

A control sequence according to this embodiment will be described below with reference to FIG. 5A. S01 to S10 are the same as those in the first embodiment.

In S11, an expected processing time for printing is calculated. The expected processing time for printing is calculated based on information obtained in S10 and information (convenience information of a printing apparatus 100)) about a printing operation by the printing apparatus 100. The convenience information of the printing apparatus 100 includes, for example, the remaining amounts of the sheets held by the rolls R1 and R2. As shown in FIGS. 7A and 7B, when the remaining sheet amount of the roll R1 is small, it is necessary to resume the remaining printing operation of the print job by driving the roll R2 during printing. In this embodiment, therefore, the expected processing time for printing of the print job 400 is calculated for each of the rolls R1 (FIG. 7A) and R2 (FIG. 7B).

First, the expected processing time for printing which is required to complete printing on the sheet supplied by driving the roll R1 is calculated. In FIG. 7A, images formed on the sheet supplied by driving the roll R1 are images of page numbers 1 and 2 corresponding to image data 401a and 401b, and the expected processing time for printing is calculated by a method exemplified below.

expected processing time for printing=$(A\_4a)+(B\_4a)/(C\_4a)$ (A_4a): preparation time for printing=(A1_4a)
   (A1_4a): conveyance time of sheet from sheet supply unit 1 to print unit 4 by driving roll R1
(B_4a): printing length of calculation object=(B1_4a)+(B2_4a)+(B3_4a)
   (B1_4a): printing length of preliminary discharge pattern
   (B2_4a): printing length of printing product of page number 1
   (B3_4a): printing length of cut patterns inserted to sheet by driving roll R1
(C_4a): printing rate of printing apparatus In this embodiment, assume that (A_4a)=(A1_4a)=6 sec. Furthermore, (B_4a)=450 mm, (B1_4a)=200 mm, (B2_4a)=150 mm, (B3_4a)=50 mm×2=100 mm, and (C_4a)=50 mm/sec. Consequently, the expected processing time for printing is 15 sec.

Next, the expected processing time for printing which is required to complete printing on the sheet supplied by driving the roll R2 is calculated. In FIG. 7B, images formed on the sheet by driving the roll R2 are images of page numbers 3 and 4 corresponding to image data 401c and 401d, and the expected processing time for printing is calculated by a method exemplified below.

expected processing time for printing=$(A\_4b)+(B\_4b)/(C\_4b)$ (A_4b): preparation time for printing=(A1_4b)
   (A1_4b): conveyance time of sheet from sheet supply unit 1 to print unit 4 by driving roll R2
(B_4b): printing length of calculation object=(B1_4b)+(B2_4b)+(B3_4b)
   (B1_4b): printing length of preliminary discharge pattern
   (B2_4b): printing length of printing product of page number 3
   (B3_4b): printing length of cut patterns inserted to sheet by driving roll R2
(C_4b): printing rate of printing apparatus In this embodiment, assume that $(A\_4b)=(A1\_4b)=8$ sec, $(B\_4b)=500$ mm, $(B1\_4b)=200$ mm, $(B2\_4b)=200$ mm, $(B3\_4b)=50$ mm×2=100 mm, and $(C\_4a)=50$ mm/sec. Consequently, $(B\_4b)=500$ mm is obtained and the expected processing time for printing is 18 sec.

Each expected processing time for printing is calculated, as described above, and the process advances to S12.

Note that $(A1\_4b)=8$ sec and $(A1\_4b)>(A1\_4a)=6$ sec in this example. That is, the conveyance time of the sheet by driving the roll R1 is different from that of the sheet by driving the roll R2. This is because the conveyance distance of the sheet from the sheet supply unit 1 to the print unit 4 by driving the roll R2 is longer than that obtained by driving the roll R1.

In S12, an expected remaining time for input completion is calculated. Similarly to S11, the expected remaining time for input completion is calculated for each of the rolls R1 (FIG. 7A) and R2 (FIG. 7B).

First, the expected remaining time for input completion of a print job 400 (to be referred to as a "print job $400_1$" hereinafter) corresponding to printing executed on the sheet supplied by driving the roll R1 is calculated. The expected remaining time for input completion of the print job $400_1$ is calculated by a method exemplified below.

A calculation timing is the timing when print data for the image data 401a of page number 1 is generated to set the printing start enable state, for example, 30 sec after a print instruction.

expected remaining time for input completion=
$\{(D\_a)-(E\_a)\}/(F\_a)$ (D_a): total data size of print job $400_1$
(E_a): data size of received data at calculation timing
(F_a): inputting rate of print job $400_1$ (receiving rate; average value for predetermined time after print instruction)

In this embodiment, (D_a)=300 MB (the total data size of the image data 401a and 401b), (E_a)=450 MB, and (F_a)=15 MB/sec (the average value for 30 sec after the print instruction). Consequently, the expected remaining time for input completion is −10 sec.

Note that when (E_a)>(D_a), reception of data is already complete. That is, this means that it is possible to immediately start printing on the sheet supplied by driving the roll R1. Since the above-described expected remaining time for input completion of the print job $400_1$ is −10 sec, it is possible to immediately start printing on the sheet supplied by driving the roll R1.

Based on the result, the magnitude relationship between the expected remaining time for input completion and the expected processing time for printing is determined in S13. In the above-described example, the expected remaining time (−10 sec) for input completion is shorter than the expected processing time (15 sec) for printing, the process advances to S06 to start printing.

Next, the expected remaining time for input completion of a print job 400 (to be referred to as a "print job $400_2$" hereinafter) corresponding to printing executed on the sheet supplied by driving the roll R2 is calculated. The expected remaining time for input completion of the print job $400_2$ is calculated by a method exemplified below.

A calculation timing is the timing when print data for the image data 401c of page number 3 is generated to set the printing start enable state, for example, 55 sec after the print instruction.

expected remaining time for input completion=
$\{(D\_b)-(E\_b)\}/(F\_b)$ (D_b): total data size of print job $400_2$
(E_b): data size of received data at calculation timing
(F_b): inputting rate of print job $400_2$ (receiving rate; average value for predetermined time after print instruction)

In this embodiment, (D_b)=1,000 MB, (E_b)=825 MB, and (F_b)=15 MB/sec (the average value for 45 sec after the print instruction). Consequently, the expected remaining time for input completion is 11.7 sec.

Note that the above-described numerical values change depending on preparation for driving or stopping the roll R1 or R2 and processing of cutting the sheet at the cut pattern.

Based on the result, the magnitude relationship between the expected remaining time for input completion and the expected processing time for printing is determined in S13. In the above-described example, the expected remaining time (11.7 sec) for input completion is shorter than the expected processing time (18 sec) for printing, the process advances to S06 to start printing.

As described in this embodiment, it is possible to perform part of printing of the print job 400 on the sheet supplied by driving the roll R1, and perform the remaining part on the sheet supplied by driving the roll R2. In this case, it is possible to obtain the same effects as those in the aforementioned first embodiment by separately calculating each time for each of the print jobs $400_1$ and $400_2$.

(Fifth Embodiment)

The fifth embodiment will be described with reference to FIGS. 5 and 7. In the aforementioned fourth embodiment, a case in which the print job 400 is printed on the two different sheets has been exemplified, and each time is separately calculated. In this embodiment, the time (roll switching time) taken to switch between a sheet supplied by driving a roll R1 and a sheet supplied by driving a roll R2 is also considered.

In S11, an expected processing time for printing is calculated by a method exemplified below.

expected processing time for printing=$(A\_5)+(B\_5)/(C\_5)$ (A_5): preparation time for printing=$(A1\_5)+(A2\_5)+(A3\_5)$
  (A1_5): conveyance time of sheet from sheet supply unit 1 to print unit 4 by driving roll R1
  (A2_5): roll switching time in sheet supply unit 1
  (A3_5): conveyance time of sheet from sheet supply unit 1 to print unit 4 by driving roll R2
(B_5): printing length of calculation object=$(B1\_5)+(B2\_5)+(B3\_5)+(B4\_5)$
  (B1_5): printing length of preliminary discharge pattern
  (B2_5): printing length of printing products except for last page of print job 400
  (B3_5): printing length of cut patterns inserted up to point immediately before last page of print job 400
  (B4_5): printing length of preliminary discharge patterns inserted up to point immediately before last page of print job 400
(C_5): printing rate of printing apparatus In this embodiment, (A1_5)=6 sec, (A2_5)=10 sec, and (A3_5)=8 sec, resulting in (A_5)=24 sec. Furthermore, (B1_5)=200 mm, (B2_5)=450 mm, (B3_5)=50 mm×5=250 mm, and (B4_5)=200 mm×1, resulting in (B_5)=1,100 mm. Assume that (C_5)=50 mm/sec. Consequently, the expected processing time for printing is 46 sec.

The roll switching time (A2_5) indicates, for example, a period from when supply of the sheet by driving the roll R1 is stopped until preparation for driving the roll R2 is completed.

A control sequence from S12 is the same as that in the first embodiment.

As described above, according to this embodiment, it is possible to obtain the same effects as those in the aforementioned fourth embodiment while considering the roll switching time.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

(Others)

The five embodiments have been described by exemplifying the arrangement of the inkjet printing method of performing printing by applying ink as a printing agent on a roll sheet. However, the present invention is not limited to these embodiments. Changes may be made in accordance with specifications and the like, or the arrangements of the respective embodiments may be combined.

For example, "printing" can include, in addition to printing of forming significant information such as characters and graphics, printing in a broad sense regardless of whether information is significant or insignificant. For example, "printing" need not be visualized to be visually perceivable by humans, and can also include printing of forming images, figures, patterns, structures, and the like on a printing medium, or printing of processing the medium.

In addition, "printing agent" can include a consumable used for printing in addition to "ink" used in each embodiment described above. For example, "printing agent" can include a liquid which is used to process a printing medium or to process ink (for example, to solidify or insolubilize a colorant in ink applied onto a printing medium) as well as a liquid which is applied onto a printing medium to form images, figures, patterns, and the like. Furthermore, it is possible to adopt, for example, an arrangement configured to perform printing by applying ink onto an intermediate transfer medium and then transferring the ink onto a printing medium, instead of an arrangement configured to directly apply ink onto a printing medium. It is also possible to use an arrangement configured to perform monochrome printing using one type of ink (for example, black ink), instead of an arrangement configured to perform color printing using a plurality of types of inks.

In addition, "printing medium" can include any media capable of receiving a printing agent, such as cloth, plastic films, metal plates, glass, ceramics, resin, wood, and leather, as well as paper used in general printing apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-266129, filed Dec. 24, 2013, and No. 2014-209398 filed Oct. 10, 2014, which are hereby incorporated by reference herein in their entirety.

What is claimed is:

1. A control apparatus comprising:
a reception unit configured to receive image data;
a setting unit configured to set an operation mode;
an image processing unit configured to generate print data based on the image data received by the reception unit;
a print control unit configured to cause a printing unit to perform printing on a printing medium based on the print data generated by the image processing unit;
a determination unit configured to determine whether reception of all the image data is complete before the printing unit completes predetermined printing based on the print data generated by the image processing unit; and
a change unit configured to change, in a case where the operation mode set by the setting unit is an operation mode in which printing based on the print data starts if the image processing unit generates the print data, the set operation mode to an operation mode in which printing based on the print data does not start even if generation of the print data is complete, in accordance with a determination result of the determination unit.

2. The apparatus according to claim 1, wherein, in a case where the setting unit sets the operation mode in which printing based on the print data starts if the image processing unit generates the print data and the determination unit determines that reception of all the image data is not complete before the printing unit completes the predetermined printing based on the print data generated by the image processing unit, the change unit changes the set operation mode to the operation mode in which printing based on the print data does not start even if generation of the print data is complete.

3. The apparatus according to claim 1, wherein the determination unit performs the determination after the change unit makes the change, and,
in a case where the determination unit further determines, after the change unit makes the change, that reception of all the image data is complete before the printing unit completes the predetermined printing based on the print data generated by the image processing unit, the change unit changes the changed operation mode to the operation mode in which printing based on the print data starts if the image processing unit generates the print data.

4. The apparatus according to claim 1, wherein a time until the printing unit completes the predetermined printing based on the print data generated by the image processing unit is specified based on a data amount of image data which have not been received yet by the reception unit and a data amount of image data which the reception unit receives per unit time.

5. The apparatus according to claim 4, wherein the data amount of the image data which have not been received yet is obtained based on a data amount obtained by the reception unit and a total data amount of the image data.

6. The apparatus according to claim 1, wherein a time until reception of all the image data is completed is specified based on a data amount of the print data based on the image data and a data amount of print data which the printing unit processes per unit time when the printing unit performs printing.

7. The apparatus according to claim 6, wherein the time until reception of all the image data is completed is specified based on a printing time based on the print data and a printing time of a maintenance pattern of the printing unit.

8. The apparatus according to claim 6, further comprising an obtaining unit configured to obtain, for every predetermined period, a data amount of the image data which have not been received yet by the reception unit,
wherein, after the change unit makes the change, the determination unit performs the determination based on the data amount obtained by the obtaining unit for every predetermined period.

9. The apparatus according to claim 1, wherein a printing apparatus including the printing unit can switch, as a printing operation mode, enable/disable of an operation mode using a hold method in which printing based on the print data starts if the print data is generated, and
the change unit switches enable/disable of a print mode using the hold method.

10. The apparatus according to claim 1, wherein a printing apparatus including the printing unit can switch, as an image processing operation mode, enable/disable of an operation mode using an on-the-fly method, and
in a case where a print mode using the on-the-fly method is enabled, the determination unit performs the determination.

11. The apparatus according to claim 1, further comprising a notification unit configured to notify a user of an operation mode of a printing apparatus.

12. The apparatus according to claim 1, wherein the printing medium includes a roll sheet.

13. A control method comprising:
receiving, by a reception unit, image data;
setting, using a processor, an operation mode;
generating, using the processor, print data based on the image data received in the receiving;
causing a printing unit to perform printing on a printing medium based on the print data generated in the generating;
determining, using the processor, whether reception of all the image data is complete before predetermined printing based on the print data generated in the generating is completed in the causing; and
changing, using the processor, in a case where the operation mode set in the setting is an operation mode in which printing based on the print data starts if the print data is generated in the generating, the set operation mode to an operation mode in which printing based on the print data does not start even if generation of the print data is complete, in accordance with a determination result in the determining.

14. A non-transitory computer-readable storage medium storing a computer program for causing a computer to execute each a control method, the method comprising:
receiving, by a reception unit, image data;
setting an operation mode;
generating print data based on the image data received in the receiving;
causing a printing unit to perform printing on a printing medium based on the print data generated in the generating;
determining whether reception of all the image data is complete before predetermined printing based on the print data generated in the generating is completed in the causing; and
changing, in a case where the operation mode set in the setting is an operation mode in which printing based on the print data starts if the print data is generated in the generating, the set operation mode to an operation mode in which printing based on the print data does not start even if generation of the print data is complete, in accordance with a determination result in the determining.

* * * * *